United States Patent [19]

Butts

[11] 4,454,501
[45] Jun. 12, 1984

[54] PROMPTING CONTROL

[75] Inventor: Orville R. Butts, West Lafayette, Ind.

[73] Assignee: Roper Corporation, Kankakee, Ill.

[21] Appl. No.: 376,403

[22] Filed: May 10, 1982

Related U.S. Application Data

[63] Continuation of Ser. No. 172,252, Jul. 25, 1980, Pat. No. 4,341,197.

[51] Int. Cl.³ .......................... G08C 9/00; F24C 3/08; H05B 3/68
[52] U.S. Cl. ............................. 340/365 R; 340/365 S; 340/711; 340/286 M; 219/453; 126/39 BA
[58] Field of Search ................ 340/365 R, 365 S, 711, 340/712, 286 M, 286 R; 219/452, 453; 126/39 BA

[56] References Cited

U.S. PATENT DOCUMENTS

| | | | |
|---|---|---|---|
| 3,886,539 | 5/1975 | Gould | 219/453 |
| 3,974,472 | 8/1976 | Gould | 340/711 |
| 4,119,957 | 10/1978 | Sasaki et al. | 340/711 |
| 4,141,001 | 2/1979 | Suzuki et al. | 340/711 |
| 4,158,759 | 6/1979 | Mason | 340/365 R |

FOREIGN PATENT DOCUMENTS 2042310  9/1980  United Kingdom .......... 126/39 BA Primary Examiner—Donnie L. Crosland
Attorney, Agent, or Firm—C. Frederick Leydig; Dennis R. Schlemmer; David J. Richter

[57] ABSTRACT

A control arrangement for a multi-function cooking appliance which has a plurality of cooking stations. The control arrangement includes a control panel having a group of keys for entering control information for the stations and functions of the cooking appliance and a prompting display for messages which assist in entering the control information through the keys. At least some of the keys are of a two-mode variety wherein, in one mode, the depression of a typical key enters a number, which appears on a digital display, such as in the selection of a cooking time or temperature. In its other mode the typical two-mode key enters other control information such as a particular function of the cooking appliance to be activated.

10 Claims, 5 Drawing Figures

PROMPTING CONTROL

This is a continuation of application Ser. No. 172,252 filed July 25, 1980 now U.S. Pat. No. 4,341,197.

DESCRIPTION OF THE INVENTION

This invention relates generally to multi-function cooking appliances and more particularly concerns prompting control arrangements therefor.

A great number of cooking appliances presently produced include more than one cooking station in the same appliance, often with several functions being availble for one or more of the different cooking stations. For example, a single cooking appliance may include four burners or other surface heating elements at one cooking station, and a combination conventional and microwave oven at a second. The oven may be capable of baking, broiling, microwave, cooking, and combination cooking, as well as other functions.

In order to enter cooking control information such as the temperature and the time for each of the various cooking functions of such multi-function appliances, a fairly complicated control panel has conventionally been required. Typically an analog control knob for entering times and temperatures is associated with each group of cooking station controls. In single function microwave ovens, a digital key pad is often provided which is used to enter temperatures and times for various types of microwave cooking. In the case of the microwave oven control, an instruction book is generally required in order to enable the user of the oven to control the various microwave cooking types. Normally, only a frequent user of the appliance is able to enter the more common cooking control information for the oven without consulting the instruction book.

Due to cost and control panel space limitations in multistation and multifunction cooking appliances, providing a separate digital key pad for each station or function is impractical. It would, in fact, enhance the compactness of a control panel utilizing keys to be able to reduce the total number of the cooking station and function control keys. However, since, as indicated above, the mere coordination of a single digital key pad with several microwave cooking settings is difficult without reference to an instruction book, it can be seen that reducing the number of control keys while using conventional cooking appliance control techniques would be extremely difficult for some users of the cooking appliance.

It is consequently an object of the present invention to provide a control arrangement for a multi-function cooking appliance, such as one having a plurality of cooking stations, which permits a reduced control panel size relative to that which would be necessary using current control techniques while maintaining at least an equivalent level of sophistication for control information entry.

It is a further object of the present invention to provide such a control arrangement for a multi-function cooking appliance wherein a user of the appliance has the benefit of prompting messages while entering control information through the keys.

Other objects and advantages of the invention will become apparent upon reading the following detailed description and upon reference to the drawings, in which.

Figure 1:
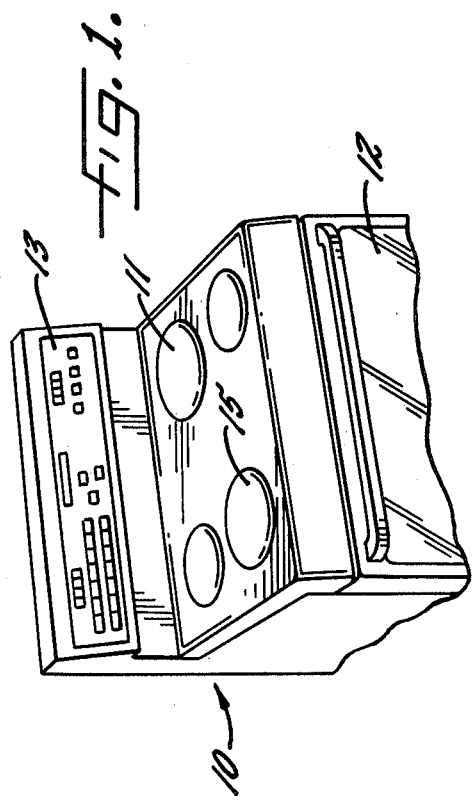
FIG. 1 is a perspective view of a portion of a cooking appliance having a control arrangement in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

In particular, reference will be made herein to keys for the entry of data, and as used herein the term "key38 is intended to include such other touch responsive arrangements as, for example, capacitive and pressure-sensitive switches which are free of mechanical parts. In addition, certain of the keys described herein will include an identifiable second mode of operation which is indicated, for example, by backlighting a symbol representing the second mode for the key. The particular type of multi-function key mode presentation is not critical to the practice of the invention and may include backlighting, LED's, or some other form of changeable key labelling.

With initial reference to FIG. 1, there is shown a multifunction cooking appliance 10 which is a combined stove and combination oven appliance. The stove portion includes four surface heating elements such as 11 and 15, and the oven 12 is a combination microwave and thermal cooking cavity. A control panel 13 permits the entry of control information for the several functions of the cooking cavity 12 and for activating the surface heating elements such as 11.

Figure 2:
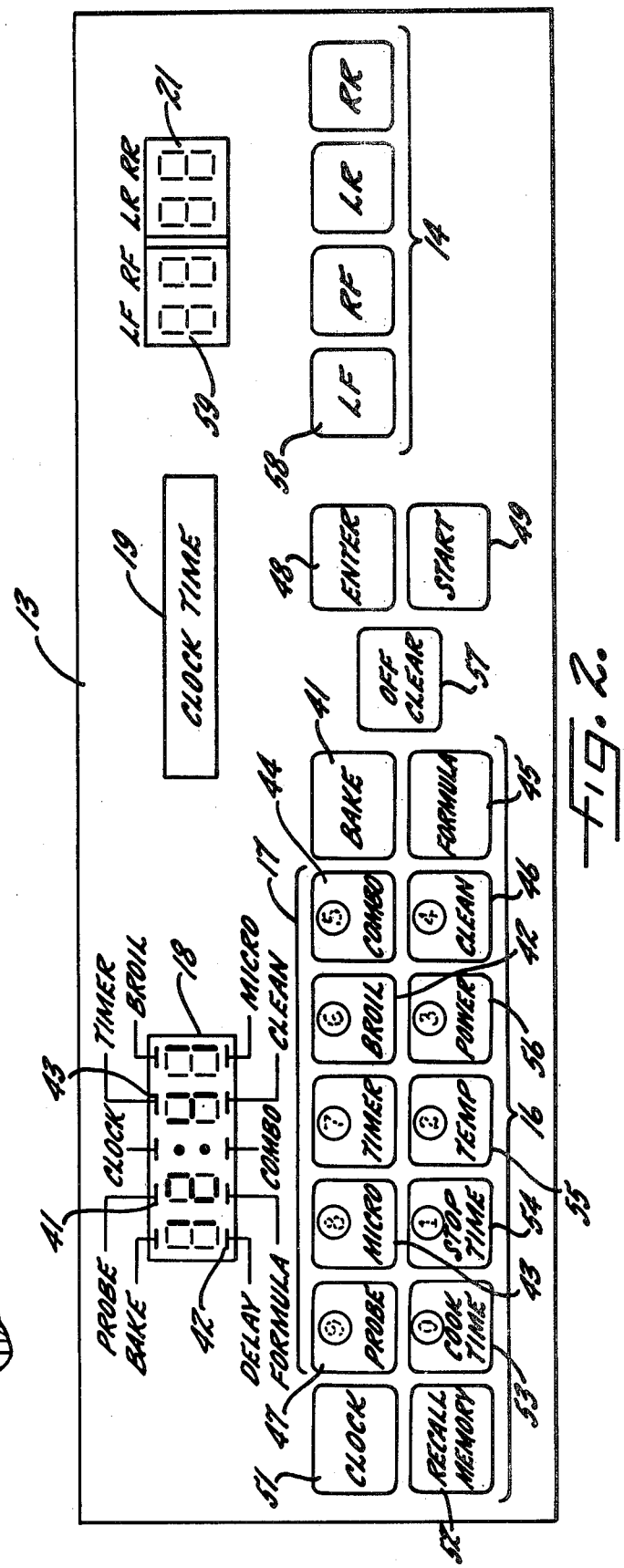
FIG. 2 is an enlarged view of the control panel of the appliance of FIG. 1.

The control panel 13, as best shown in FIG. 2, includes a group 14 of keys for enabling the activation of the surface heating elements 11 and a group 16 of keys for entering control information for the combination oven 12. The key group 16 in coordination with the key group 14 also permits the entry of control information for the surface heating elements. Within the group of keys 16 is a group 17 of ten dual mode keys, operable in one mode to enter control information such as cooking function selection, and in a second mode to enter the digits 0 through 9 such as for selecting temperature and time of cooking.

A digital display 18, which normally displays the current time when the oven 12 is not in operation, during the entry of control information to the appliance indicates the time and temperature information which is being entered through the key group 17. The digital display 18 may be, for example, an LED or LCD type. The display 18 includes several annunciator bars, which may be implemented in the same fashion as the elements of the display digits; the function of the annunciator bars shall be discussed in more detail hereinafter. An alphanumeric prompting display, which may also be an LED or LCD type, is also provided on the control panel 13.

A single line of the alphanumeric prompting display 19 generally indicates the quantity to be keyed in and displayed in the digit display 18. In the exemplary case of FIG. 2, wherein no cooking function is currently being performed, the actual time, or clock time, is displayed in the digit display 18 and identified by the prompting display 19. A burner, or surface heating element, display 21 is also provided for indicating the level of activation of each of the elements 11.

Figure 3:
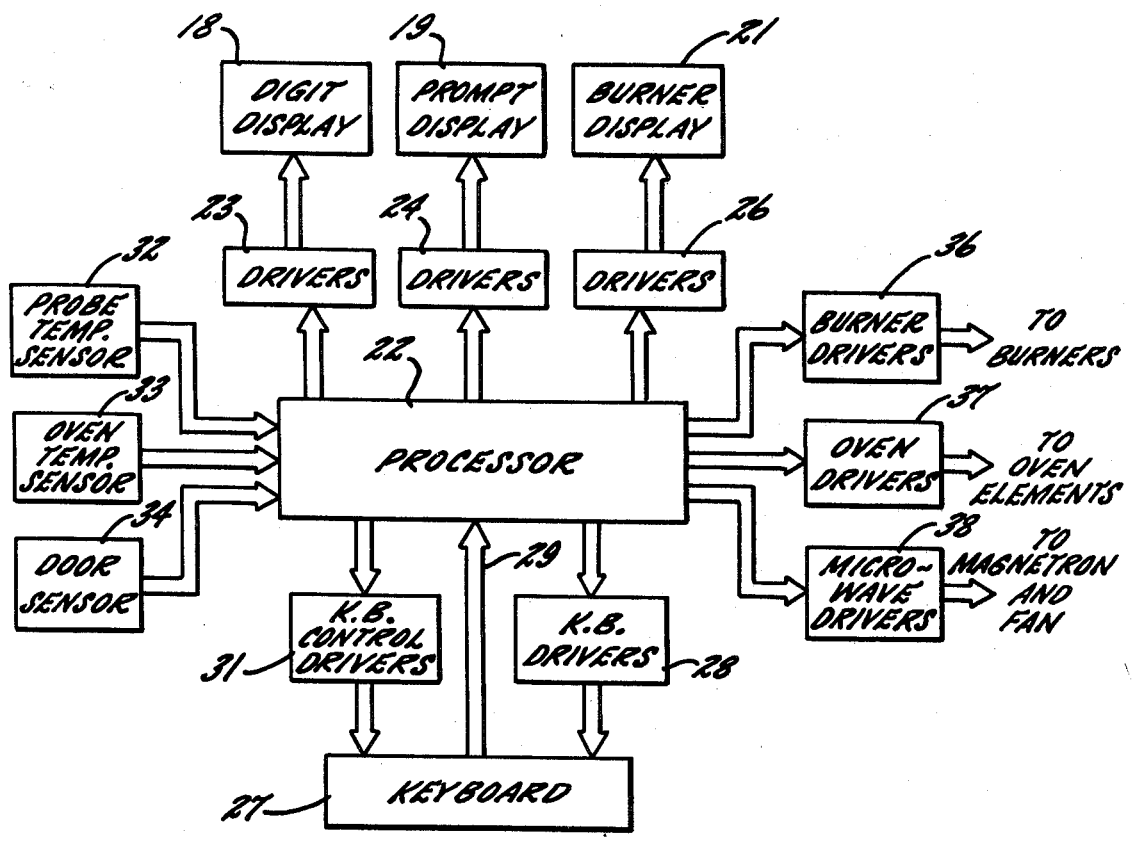
FIG. 3 is a block diagram of a processor and associated elements for operating the control arrangement of the cooking appliance of FIG. 1; showing the various elements associated with the control arrangement.

In the exemplary control arrangement, as shown in FIG. 3, a single microprocessor circuit 22 transfers the cooking control commands from the control panel keys to the cooking stations for the cooking functions to be performed. The processor circuit 22 also calls up the appropriate prompting phrases for the prompting display depending upon the cooking function control information being entered. The displays 18, 19 and 21 are driven through appropriate drives 23, 24 and 26, respectively, by the processor 22.

The various keys on the control panel 13, designated generally as a keyboard 27, communicate the actual control information to the processor circuit 22. The processor 22 provides signals which are available at the keys through appropriate keyboard drivers 28, and depression of keys on the keyboard 27 results in the return of recognizable signals on lines 29 to the processor 22. The keyboard 27 also receives keyboard control signals through keyboard control drivers 31 to activate the mode indicators, such as backlighting, for the dual mode keys in the key group 17 so that the appliance user may identify the present mode of a particular dual mode key.

The processor circuit 22 also receives information from various cooking appliance sensors. For example, probe and oven temperature sensors, 32 and 33, respectively, provide temperature information from the oven. A door sensor 34 provides an indication if the door of the oven is open in order to prevent operation of the microwave function of the oven when the door is open.

The processor 22, in response to control information entered through the keyboard 27, controls the burners 11 through burner drivers 36, the thermal heating elements for the oven through oven drivers 37, and the microwave magnetron and fan through microwave drivers 38.

The operation of a stored program microprocessor such as the processor 22 for receiving sensor information and issuing control commands to the various cooking elements of a cooking appliance is conventional and shall not be described in detail herein. Rather, the present invention is embodied in the exemplary control arrangement with its associated displays and keys which interact with the processor 22 to facilitate the entry of control information for the various cooking functions.

Figure 4:
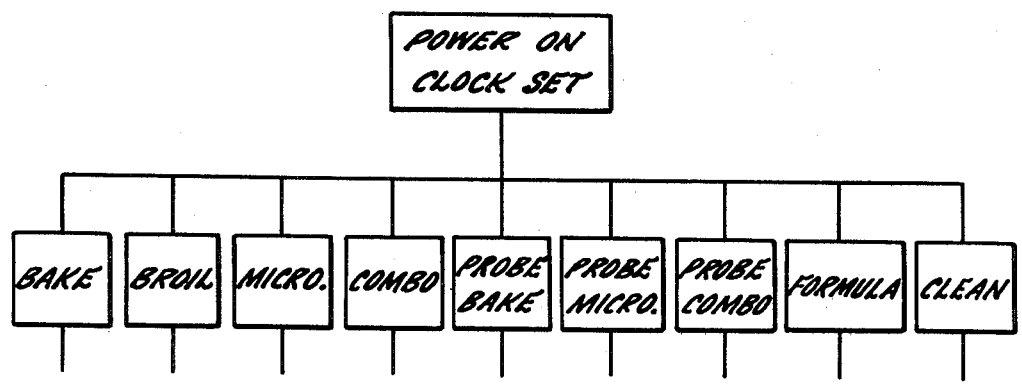
FIG. 4 is an illustration of the principal controlinformation entry functions for the control arrangement.

As shown in FIg. 4, there are nine major functions for which control information may be entered through the control panel 13 for the exemplary cooking appliance 10. With power supplied to the appliance and the clock set, the cooking appliance is in condition to receive control information for any of the nine major functions. The setting of the clock is generally visible on the clock display 18 when it is not being used to display a cooking information parameter such as temperature or time.

The major functions for the exemplary cooking appliance are, as shown in FIG. 4: bake, broil, microwave cooking, combination cooking, probe bake, probe microwave cooking, probe combination cooking, formula cooking, and cleaning. The entry of control information through the control panel 13 for the nine major functions of the cooking appliance begins with the depression of an appropriate key, or in the case of the three "probe" functions two keys, in the key group 16. With reference to the keyboard of FIG. 2, the major functions bake, broil, microwave cooking, combination cooking, formula, and clean are initiated by depressing the respective BAKE key 41, BROIL key 42, MICRO key 43, COMBO key 44, FORMULA key 45, and CLEAN key 46. The probe bake function is intiated by first contacting the PROBE key 47 followed by the BAKE key 41. Similarly, the probe microwave cooking function control sequence is initiated by first depressing the PROBE key 47 followed by the MICRO key 43, and the probe combination cooking control sequence is intiated by contacting the PROBE key 47 and the COMBO key 44.

After a major function has been selected, digital data for cooking times and temperatures are entered through the group of dual mode keys 17 with the aid of prompting phrases on the prompting display 19. The time or temperature data entered on the keys 17 is displayed in the digit display 18 during the data entry sequence. Once the control information is entered, and stored in memory by the processor circuit 22, the stored cooking commands are executed in conventional fashion. Depending upon the major function selected, the processor 22 sequentially stores the control information as it is entered in appropriate memory locations and recalls from memory appropriate stored prompting instructions for aiding the user of the appliance in entering the control information.

In addition to the four-digit display sections, the digital display 18 further includes the several annunciator bars such as the PROBE annunciator bar 41. The annunciator bars are indicative of a particular cooking function which is being programmed or performed, or of a particular timing function. For example, when the cooking appliance is not being used, the CLOCK annunciator bar indicates that the numerals in the digital display 18 represent the actual clock time. An annunciator bar is provided for each of the six non-probe major functions, and the PROBE annunciator bar 41 is activated in combination with either the BAKE, MICRO, or COMBO annunciator bar in order to indicate one of the three probe major functions. The delay indication by the DELAY annunciator bar 42 shall be discussed hereinafter. The TIMER annunciator bar 43 indicates that the digital display is in a timing, or countdown, mode (apart from timing a cooking function) and that the displayed time is the amount of time to the end of the timed interval.

Figure 5:
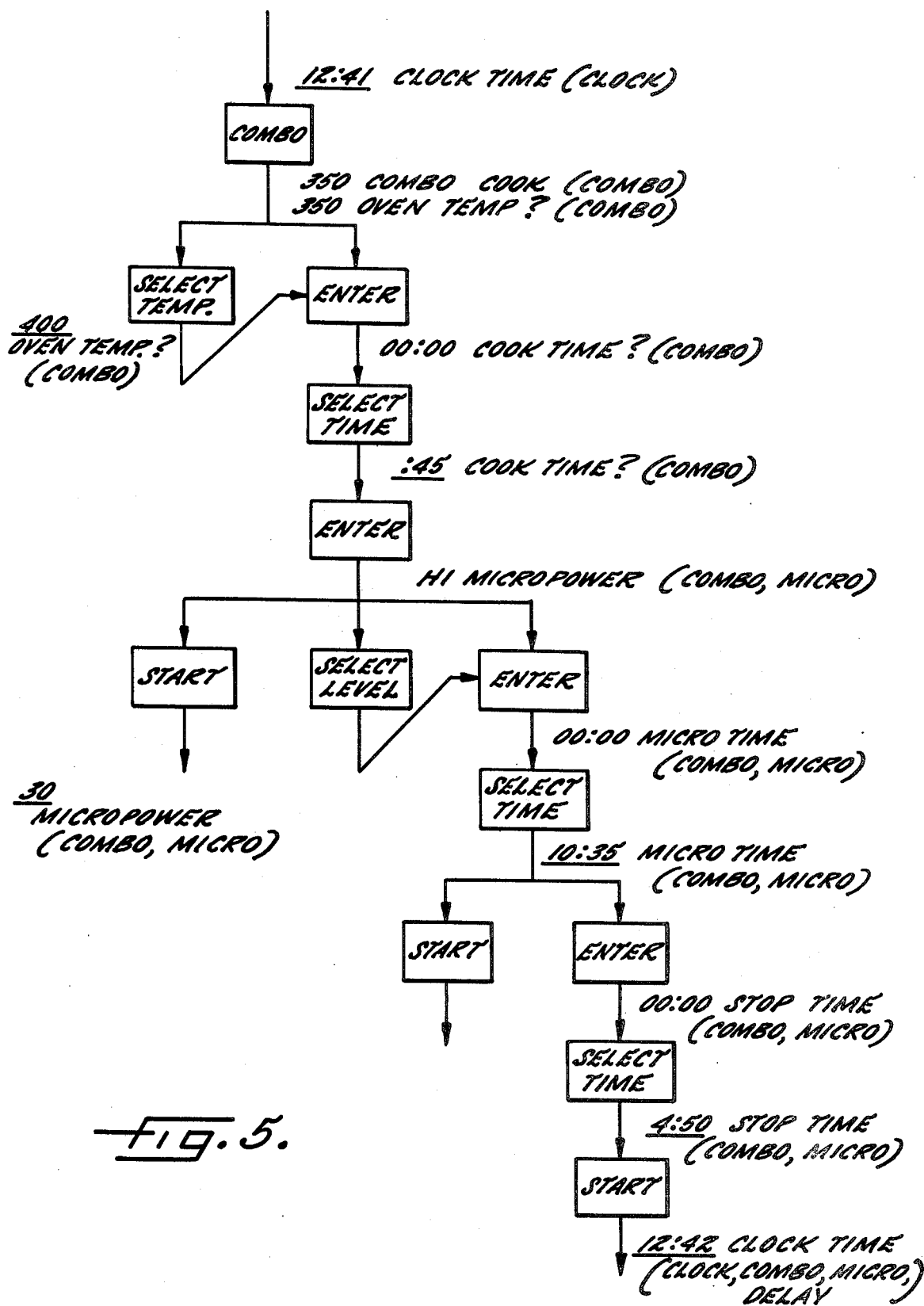
FIG. 5 is a more detailed flow diagram for the combination cooking function data entry including a showing of the display conditions during the control data entry sequence.

In order to further explain the interaction between the programmed processor circuit 22 and the elements of the control panel 13 for control information entry, the control information entry sequence for an exemplary major function, the combination cooking function, shall be described in detail in conjunction with FIG. 5. In FIG. 5, the blocks correspond to key entries through the keys of the keyboard 27, and the three items of information generally to the right of the blocks are, in order, the contents of the digit display 18, the phrase in the prompting display 19, and a listing of the annunciator bar or bars which are activated.

Prior to the entry of control information for a major function, a clock time appears in the digital display, the phrase CLOCK TIME appears in the prompting display and the CLOCK annunciator bar is lit. Throughout FIG. 5, underlined entries are exemplary selected times or temperatures or an arbitrary time of the day. The exemplary actual clock time initially, as shown, is 12:41.

When the COMBO key 44 is depressed, the processor responds by calling up from memory a programmed nominal temperature of 350° which is entered in the digital display 18. The processor also recalls the first prompting phrase, COMBO COOK and displays it in the prompting display 19. Simultaneously, the COMBO annunciator bar is activated and the CLOCK annunciator bar deactivated. After a brief pause, the processor places the next prompting phrase OVEN TEMP? in the prompting display. The ten dual mode keys in the key group 17 are now backlighted to show the ten digits 0 through 9 as indicated in dotted lines. The ENTER key 48 is also backlighted and is now functional.

Should thermal cooking in the combo mode at an oven temperature of 350° be desired, the ENTER key is depressed. Should a different temperature be desired; for example, 400° as shown, the digital keys 4, 0, 0, are depressed, followed by the ENTER key. After the selected temperature is entered, the processor converts the digital display to a time mode at 00:00 and displays the next prompting phrase COOK TIME?. The user entering control information then enters on the digital keys in the key group 17 a desired length of time for thermal cooking, for example 45 minutes. Then the ENTER key is again depressed, and the next prompting phrase appears.

The next prompting phrase called up from the microprocessor memory is MICRO POWER, and the MICRO annunciator bar is also activated in addition to the COMBO annunciator bar. Simultaneously, the digital display is set by the processor to indicate HI microwave power. At this point, the START key 49 is also activated in addition to the ENTER key. Should the user desire high microwave power for the entire 45 minutes of thermal cooking already selected, the start key is depressed, and the combo cooking instructions entered are implemented by the processor. Should a different level of microwave power be desired, the user may enter a percentage of the high microwave power, such as the exemplary 30 percent shown in FIG. 5. The selected percentage, such as 30, is visible in the display after being entered through the keyboard. Should a different time for microwave cooking be desired, rather than the 45 minutes selected for thermal cooking, the enter key is again depressed and the processor calls up the next prompting message which is MICRO TIME. The digital display also goes to a time entry format. The user then selects a time for MICRO POWER, which in the example is 10 mintues and 35 seconds.

In order to begin the combination cooking as thus far selected, the start key 49 is then depressed. This provides 45 minutes of thermal cooking at 400° with, for the first 10 minutes and 35 seconds, 30% of full MICRO POWER.

Should the user not desire the cooking to begin immediately, the ENTER key rather than the START key is depressed, and the processor displays the next prompting phrase, STOP TIME, while maintaining the display at 00:00. The control sequence will now include a delay mode of operation for the combination cooking function. A time of day for the end of the thermal cooking time is selected, for example 4:50. This time is entered through the digital key group 17. Since this is the final prompting phrase in the sequence, the enter key is no longer activated and only the START key will respond if depressed. When the START key is contacted, the combination cooking control information entry sequence is ended and the prompting display returns to the phrase CLOCK TIME. The current time, such as 12:42, is displayed in the digital display. Since the clock time is being displayed, the CLOCK annunciator bar is activated as are the annunciator bars for COMBO, MICRO and DELAY. These three annunciator bars indicate the status of the functions selected and stored in the processor memory.

Returning to the control panel of FIG. 2, the major function keys 41 through 47 have been previously described. In addition, a CLOCK key 51 permits the user to see the current clock time in the digital display 18 if other information is then being displayed. The RECALL MEMORY key 52 permits the user to step through the digital information entered and the corresponding prompting phrases step by step during data entry, or at a later time permits the user to recal all programmed information. The keys 53 through 56 are "recall" keys for recalling the cooking time, stop time, temperature, and mcirowave power respectively. The OFF CLEAR key 57 terminates control data entry in a major function sequence or, if a major function control information sequence is not being entered, the key 57 may be depressed twice in a short period of time to turn off all cooking functions and blank the displays.

In order to control the surface heating elements or burners 11, a group of keys 14 for the burners is provided. Each key in the group 14 has an associated digit of the burner display 21 so that there is, for example, a key 58 and a corresponding display digit 59 for the left front heating element 15. When the key 58 is depressed, the digit mode of the dual mode keys 17 is selected and the digits are appropriately backlighted. A digit 1 (low) through 9 (high) is depressed by the user to select the heating element power and this digit appears in the display 59. After a digit is selected and displayed, the backlighting for the key group 17 is removed, and the selected temperature level remains in the display. Subsequently depressing the key 58 turns off the surface heating element 15.

In addition to the standard stored sequences of prompting phrases, which are called up in dependence upon the major function key depressed, the processor memory also contains a set of error phrases. For example, if in entering a stop time for the delay mode of combination cooking, the time 4:70 were entered by the user, the processor would recognize this as being out of an acceptable range of times and display an error message in the prompting display 19. The number of error messages stored in the processor memory is arbitrary, but since the processor is providing a prompting message for each step of data entry, it is possible to separately check each data entry to see if it is within acceptable limits for the particular function control information being entered. The processor then selects from memory an error message which is entered in the prompting display if the data entry is out of the acceptable limits.

What is claimed is:

1. In a processor-based control system having a multifunction entry keyboard for an operator to enter function commands and data, the control arrangement comprising:
   (a) keys for entering a plurality of function commands and data, and
   (b) processor-based means for defining a plurality of modes, means for defining a subset of the keys that are permissible operator key selections for each mode, and means for selecting a current mode in response to entry of a function command, and
   (c) means for directing the operator's attention to the actual physical location of the subset of keys that are permissible operator key selections for the selected mode.

2. The system as claimed in claim 1 wherein the means for directing the operator's attention to the actual physical location of said subset of keys comprises means for selectively illuminating said subset of keys.

3. The system as claimed in claim 1, further comprising
   means for selectively recognizing an operator selection of a particular one of said keys as either a predefined function command or as a predefined alphanumeric symbol in response to the current mode, and
   indicator means responsive to the current mode for visually indicating to the operator whether the particular one of said keys is being recognized as a predefined alphanumeric symbol.

4. The system as claimed in claim 3, wherein the indicator means comprises means for selectively displaying a label of the predefined alphanumeric symbol on the particular one of said keys.

5. The system as claimed in claim 1, further comprising,
   means for selectively recognizing an operator selection of a particular one of said keys as a particular one of a plurality of function commands in response to the current mode, and
   indicator means responsive to the current mode for visually indicating to the operator the particular one of the function commands being recognized for the particular one of said keys.

6. The system as claimed in claim 5, wherein the indicator means comprises means for selectively displaying a label of the recognized function command.

7. In a processor-based control system having a multifunction entry keyboard for an operator to enter function commands and data, the control arrangement comprising:
   (a) keys for entering a plurality of function commands and data, and
   (b) processor-based control system which includes means for defining a plurality of modes,
   means for selecting a current mode in response to entry of a function command, and
   means for selectively recognizing an operator selection of a particular one of said keys as either a predefined function or as data in response to the current mode, and
   (c) indicator means responsive to the current mode for visually indicating to the operator whether the particular one of said keys is being recognized as a function command or as data.

8. The control system as claimed in claim 7, wherein the indicator means comprises for selectively displaying a label of an alphanumeric symbol on the particular one of said keys.

9. In a processor-based control system having a multifunction entry keyboard for an operator to enter function commands and data, the control arrangement comprising:
   (a) keys for entering a plurality of function commands and data, and
   (b) processor-based control system which includes means for defining a plurality of modes,
   means for selecting a current mode in response to entry of a function command, and
   means for selectively recognizing an operator selection of a particular one of said keys as a particular one of a plurality of predefined function commands in response to the current mode, and
   (c) indicator means responsive to the current mode for visually indicating to the operator the particular one of the predefined function commands being recognized in response to an operator selection of the particular key.

10. The control system as claimed in claim 9, wherein the indicator means comprises means for selectively displaying a label of the particular function command on the particular one of said keys.

* * * * *